US009344857B1

(12) United States Patent
Kazeminejad et al.

(10) Patent No.: US 9,344,857 B1
(45) Date of Patent: May 17, 2016

(54) FREQUENCY BAND ALLOCATION IN A WIRELESS COMMUNICATION NETWORK (71) Applicant: Sprint Spectrum LP, Overland Park, KS (US)

(72) Inventors: Saied Kazeminejad, Ashburn, VA (US); Jasinder P. Singh, Olathe, KS (US); Brett Christian, Independence, MO (US); Senthil K. Veeraragavan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 286 days.

(21) Appl. No.: 14/072,936

(22) Filed: Nov. 6, 2013

(51) Int. Cl.
*H04W 4/06* (2009.01)
*H04W 36/00* (2009.01)
*H04W 72/04* (2009.01)

(52) U.S. Cl.
CPC ............ *H04W 4/06* (2013.01); *H04W 36/0016* (2013.01); *H04W 72/0453* (2013.01)

(58) Field of Classification Search
None
See application file for complete search history.

(56) References Cited

U.S. PATENT DOCUMENTS

| 8,780,876 | B2 * | 7/2014 | Etemad | 370/343 |
| 2012/0322446 | A1 | 12/2012 | Ramachandran et al. | |
| 2013/0039250 | A1 * | 2/2013 | Hsu | H04H 20/71 370/312 |
| 2013/0064162 | A1 | 3/2013 | Phan et al. | |
| 2014/0269566 | A1 * | 9/2014 | Wang | H04W 4/06 370/329 |
| 2014/0372624 | A1 * | 12/2014 | Wang | H04L 65/60 709/231 |
| 2015/0004924 | A1 * | 1/2015 | Kim | H04W 48/06 455/404.1 |
| 2015/0109987 | A1 * | 4/2015 | Wang | H04W 12/08 370/312 |

* cited by examiner

*Primary Examiner* — Christine Duong (57) ABSTRACT

Systems and methods for allocating a frequency band in a wireless communication network are provided. An access node can transmit a first system information message. The first system information message can include a first service identifier associated with a first service and a second service identifier associated with a second service to indicate availability of the first service and the second service over a frequency band. The access node can receive instructions to discontinue transmitting the second service identifier within the first system information message. The access node can transmit a second system information message after receiving instructions to discontinue transmitting the second service identifier. The second system information message can include only the first identifier to indicate availability of only the first service over the frequency band.

12 Claims, 5 Drawing Sheets

FREQUENCY BAND ALLOCATION IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Wireless communication can be used for various applications where the various applications can support different services such as broadcast services and unicast services. For example, mobile voice services, mobile data services, push-to-talk services, internet services, web browsing, email, pictures, picture messaging, video, broadcast video, video messaging, audio, voicemail, music, MP3's, ring tones, stock tickers, new alerts, etc.

In a broadcast service, such as multimedia broadcast multicast service (MBMS), data can be transmitted from a single source to multiple destinations over a communication network in one or more consecutive sessions of finite duration. In other words, a plurality of wireless devices can be configured to receive the same MBMS data stream at substantially the same time. When a unicast service is implemented, communication can be established between a single wireless device and an access node such that a bi-directional communications can be implemented (e.g., the wireless device can transmit and/or receive data from the access node).

When a plurality of different services, such as a broadcast service and a unicast service, are communicated over the same frequency band from the same access node, both services can be undesirably impacted. For example, unicast services can be bursty which can cause an undesirable increase in overhead messaging within the core network and can negatively impact broadcast transmissions to wireless devices.

Overview

Systems and methods for allocating a frequency band in a wireless communication network are provided. An access node can transmit a first system information message. The first system information message can include a first service identifier associated with a first service and a second service identifier associated with a second service to indicate availability of the first service and the second service over a frequency band. The access node can receive instructions to discontinue transmitting the second service identifier within the first system information message. The access node can transmit a second system information message after receiving instructions to discontinue transmitting the second service identifier. The second system information message can include only the first identifier to indicate availability of only the first service over the frequency band.

Further systems and methods for allocating a frequency band in a wireless communication network are also provided. A first access node can be instructed to transmit a first system information message. The first system information message can include a first service identifier associated with a first service and a second service identifier associated with a second service to indicate availability of the first service and the second service over a first frequency band. A second access node can be instructed to transmit a second system information message. The second system information message can include a third service identifier associated with the first service and a fourth service identifier associated with the second service to indicate availability of the first service and the second service over a second frequency band. The network node can determine to discontinue transmitting the second service over the first frequency band associated with the first access node. The network node can also determine to discontinue transmitting the first service over the second frequency band associated with the second access node. The first access node can be instructed to transmit a third system information message after the network node determines to discontinue transmitting the second service over the first frequency band. The third system information message can include only the first service identifier to indicate availability of only the first service over the first frequency band. The second access node can be instructed to transmit a fourth system information message after the network node determines to discontinue transmitting the first service over the second frequency band. The fourth system information message can include only the second service identifier to indicate availability of only the second service over the second frequency band.

DETAILED DESCRIPTION

Figure 1:
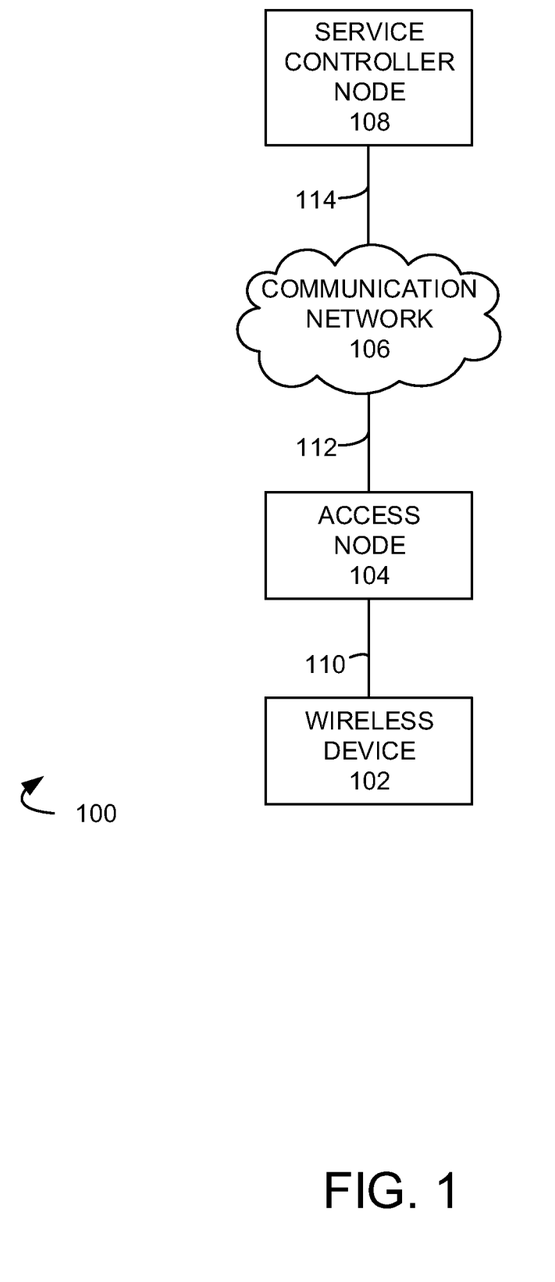
FIG. 1 illustrates a communication system to allocate a frequency band in a wireless communication network.

FIG. 1 illustrates an exemplary communication system 100 for allocating a frequency band in a wireless communication network. Communication system 100 can comprise a wireless device 102, an access node 104, a communication network 106, and a service controller node 108. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 104 and communication network 106, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented according to various exemplary embodiments disclosed herein.

The wireless interface of wireless device 102 can include one or more transceivers for transmitting and receiving data over communication system 100. Each transceiver can be associated with the same or different frequency bands, the same or different radio access technologies, the same or different network providers, and/or the same or different services. For example, wireless device 102 can include a transceiver associated with at least one wireless cellular protocol service and/or other types of wireless communication services such as a multimedia broadcast multicast service (MBMS). In addition, wireless device 102 can further include a transceiver that is associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), MBMS, etc.

Wireless device 102 can be in communication with access node 104 through communication link 110. Link 110 can use various communication media, such as air, space, metal, optical fiber, or some other signal propagation path—including combinations thereof. Communication link 110 may comprise many different signals sharing the same link. Communication link 110 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 104 could share the same representative wireless link, but be transferred over different communication sessions, frequencies, timeslots, packets, ports, sockets, logical transport links, or in different directions—including combinations thereof.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access node 104 can be any network node configured to provide communication between wireless device 102 and communication network 106. For example, access node 104 can be selected from a base transceiver station, a radio base station, an eNodeB device, or an enhanced eNodeB device, or the like. It is noted that while only one access node 104 is illustrated in FIG. 1, any number of access nodes can be implemented within system 100.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Service controller node 108 can be any network node configured to communicate service information and/or service control information over system 100. Service controller node 108 can be a standalone computing device, computing system, or network component, and can be accessible, for example, by a wired or wireless connection, or through an indirect connection such as through a computer network or communication network. For example, service controller node 108 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 108 is not limited to any specific technology architecture, such as Long Term Evolution (LTE) and can be used with any network architecture and/or protocol.

Service controller node 108 can comprise a processor and associated circuitry to execute or direct the execution of computer-readable instructions to obtain information. Service controller node 108 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Service controller node 108 can receive instructions and other input at a user interface.

Access node 104 can be in communication with communication network 106 through communication link 112. Service controller node 108 can be in communication with communication network 106 through communication link 114. Communication links 112, 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114 can be a direct link or might include various equipment, intermediate components, systems, and networks.

Communication network 106 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 106 can be capable of carrying data, for example, to support voice, push-to-talk, broadcast video, and data communications by a wireless device such as wireless device 102. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 can also comprise additional base stations, controller nodes, telephony switches, internet routers, network gateways, computer systems, communication links, or some other type of communication equipment, and combinations thereof.

A network operator can be a communication provider that provides access to a network where data streams are transmitted between a wireless device and an access node over a unicast communication session. A broadcast service provider can be a communication provider that provides a broadcast data stream from an access node to a plurality of wireless devices over a broadcast communication session. A network operator and/or a broadcast service provider can own and/or operate the nodes within the network. A primary network operator and/or a broadcast service provider can enter into relationships with other network operators and/or broadcast service providers to share resources such as frequency bands, network environments, etc. For example, multiple network providers may operate in a multi-operator core network environment, and can enter into agreements to share frequency bands or other network resources. Sharing or roaming agreements may be limited in scope, and network providers can share resources of the network while not sharing other resources of the network. For example, one network provider and/or broadcast service provider can share one frequency band with a second network provider and/or broadcast service provider while not sharing resources of another frequency band.

In operation, an access node such as access node 104 can be configured to transmit a first service data stream and a second service data stream different from the first data stream over a frequency band. For example, the first service data stream can be a broadcast service such as MBMS and the second service data stream can be a unicast service such as voice, data, email, etc. When the access node 104 transmits the first service data stream and the second service data stream over the frequency band, the access node 104 can also transmit a first system information message to indicate to a wireless device, such as wireless device 102, the availability of the first service and the second service over the frequency band where the wireless device 102 can use the first system information message to determine whether to initiate communication with the access node 104. The first system information message can include a first service identifier associated with the first service data stream and a second service identifier associated with the second service data stream where the first system information message can be a system information block one (SIB-1) message.

The access node can receive instructions from a network node to discontinue transmitting the second service identifier within the first system message. The instruction to discontinue transmitting the second service identifier can be based on a time of day and/or network conditions such as congestion, service quality, throughput, etc. After receiving the instruction to discontinue transmitting the second service identifier, the access node 104 can transmit a second system information message where the second system information message includes only the first service identifier. The second system information message can indicate to a wireless device such as wireless device 102 that only the first service is available over the frequency band where the wireless device 102 can determine whether to initiate a communication session with access node 104 based on the second system information message and an application running on the wireless device.

It is noted that for simplicity one wireless device, such as wireless device 102, is described as receiving the first system information message and the second information message. However, different wireless devices could receive each message. For example, a first wireless device could receive the first system information message and a second wireless device could receive the second system information message. Alternatively, as previously described, the first wireless device could receive both the first system information session and the second system information session.

Figure 2:
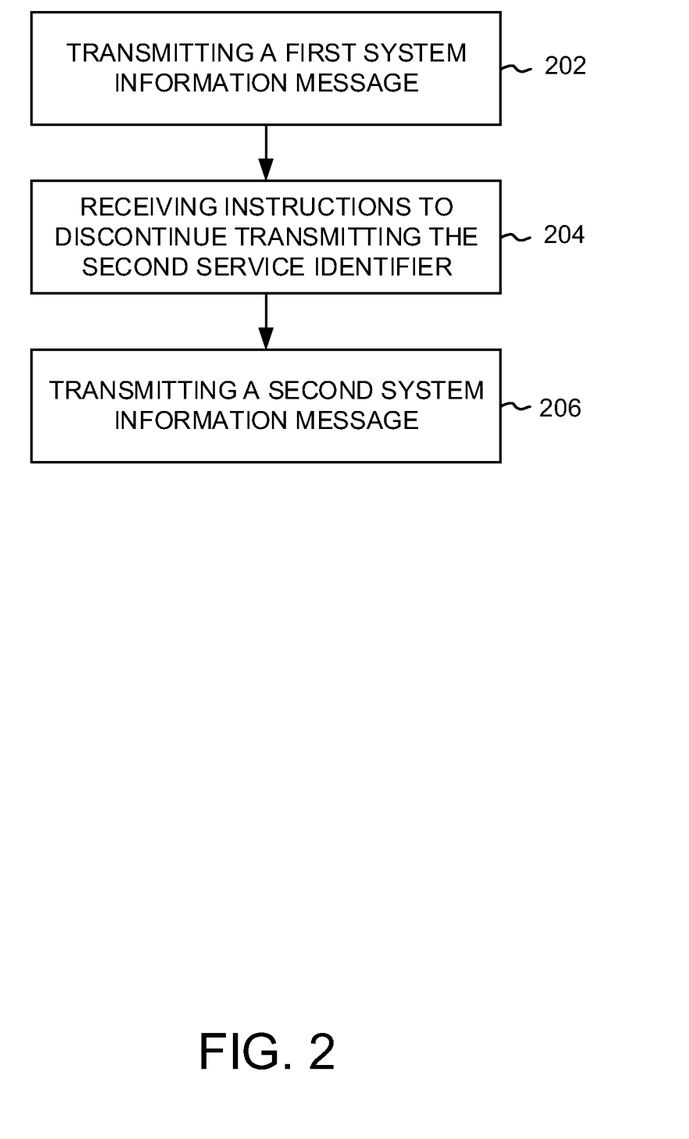
FIG. 2 illustrates an exemplary method of allocating a frequency band in a wireless communication network.

FIG. 2 illustrates a flow chart of an exemplary method of frequency band allocation in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

A network node can transmit and/or receive data using two or more different services over a single frequency band. For example, access node 104 can transmit a first service data stream and a second service data stream different from the first service data stream. The service data streams can include a broadcast service and/or a unicast service from one or more service providers.

At 202, a network node can transmit a first system information message. For example, access node 104 can transmit a first system information message including a first service identifier associated with the first service and a second service identifier associated with a second service when the first service and second service are transmitted from access node 104 over a frequency band. The first system information message can be a SIB-1 message that indicates to a wireless device the availability of the first service and the second service over a frequency band. In addition, the first service identifier and the second service identifier can be a public land mobile network (PLMN) identifier or any other identifier used to indicate the type of service, application, and/or data associated with a service provider. The wireless device 102 can determine whether to initiate communication with access node 104 based on an application running on the wireless device 102 and the services available within the frequency band.

In an exemplary embodiment, when the application running on the wireless device 102 matches one of the services available, the wireless device 102 can request to initiate a communication session with the access node 104 over the frequency band by performing an attach procedure. For example, the wireless device 102 can determine the parameters required to initiate communication with access node 104 from a system information block two (SIB-2) message where the SIB-2 message can include the configuration of the random access channel (RACH) associated with access node 104, the paging channel configuration associated with access node 104, the downlink shared channel configuration associated with access node 104, the physical uplink control channel (PUCCH) configuration associated with access node 104, timers and constants, etc. The wireless device 102 can use these parameters to establish a communication session with access node 104 over the frequency band. However, when the wireless device does not initiate communication with access node 104, the wireless device 102 does not listen for the SIB-2 message. In other words, by not listening for the SIB-2 message and thus not sending a request to initiate communication, overhead messages can be reduced within the core network because the wireless device 102 makes the decision to initiate communication with the access node 104 based on the system information message rather than sending a request to initiate communication over a frequency band that does not have the requested service and an network node in the core network denying the request.

At 204, the access node can receive instructions to discontinue transmitting the second service identifier. For example, access node 106 can receive instructions from a network node such as service controller node 108. The instructions can be indicative of an instruction to discontinue transmitting the second service and/or an instruction to discontinue transmitting the second service identifier within the first system information message. The service controller node 108 can determine to instruct the access node to discontinue transmitting the second service identifier based on various factors. For example, the time of day, network conditions associated with access node 106 and/or network conditions of the network conditions associated with a plurality of access nodes of the network such as a service area or a market area.

In an exemplary embodiment, unicast transmissions and broadcast transmissions can be transmitted and/or received between wireless device 102 and access node 104 over the frequency band. When all services are available over the frequency band, access node 104 can transmit a service identifier message including service identifiers for all available services. Service controller node 108 can determine to instruct access node 104 to transmit only one service, such as a broadcast service, during a specific time or when a network condition meets a predetermined threshold. For example, during any broadcast where a significant number of wireless devices would be running a broadcast service application such as during a primetime broadcast, a special unscheduled broadcast such as a breaking news broadcast, etc., and/or a sporting event broadcast, or the like. The broadcast data stream can be transmitted for a predetermined time period or the end of the broadcast transmission time could be determined by the service providers or the broadcasting providers. Alternatively, when network congestion, service quality, throughput, etc. meets a predetermined threshold, the service controller node 108 can determine to allocate adequate bandwidth to reduce the network congestion by reducing the number of services available over the frequency band.

After receiving instructions to discontinue transmitting the second service identifier, the access node can transmit a second system information message at 206. For example, access node can transmit a second system information message different from the first system information message in that the second system information message can include only the first service identifier. The second system information message can indicate to a wireless device the availability to communicate over the first frequency band using only the first service.

In an exemplary embodiment, a wireless device, such as wireless device 102, can run an application using the second service. After receiving the first system information message, the wireless device 102 can initiate a communication session with access node 104 over the frequency band using the second service. The access node 104 can transmit the second system information message while the wireless device 102 is in communication with the access node 104 using the second service. For example, wireless device 102 can receive the second system information message over the paging channel where the second system information message indicates to the wireless device 102 that the second service will no longer be available over the frequency band. At that point, a handover can be initiated either by the wireless device 102 or the access node 104. The wireless device can be handed over to another frequency band transmitted by the access node 104 that communicates the second service or to another access node. Alternative, when a wireless device not yet in communication with access node 104 receives the second system information message and is running an application that uses the second service, the wireless device will continue to look for another access node that is advertising the availability of the second service rather than attempt to initiate communication with access node 104.

It is noted, that the second system information message can be transmitted while the access node 104 continues to transmit both the first service and the second service in order to allow for a period to successfully complete handing over any wireless device in communication with access node 104 using the second service to prevent undesired disruptions in service. The access node 104 can determine whether all wireless devices using the second service have discontinued communication with the access node 104 before discontinuing transmissions using the second service over the frequency band.

In another exemplary embodiment, a network node can instruct the access node to re-transmit the first system information message. For example, after the period for transmitting only the broadcast service over the frequency band is elapsed (e.g., either based on the predetermined period or an indication from the service provider or the broadcast provider) and/or network conditions no longer meet a threshold, service controller 108 can instruct access node 104 to retransmit the first system information message comprising the first service identifier and the second service identifier indicating to a wireless device that the first service and the second service are available over the frequency band. After access node 104 resumes transmitting the first service and the second service over the frequency band, a wireless device, such as wireless device 102, can initiate communication with access node 104 when an application running on the wireless device 102 uses the first service or second service based on the first system information message.

Figure 3:
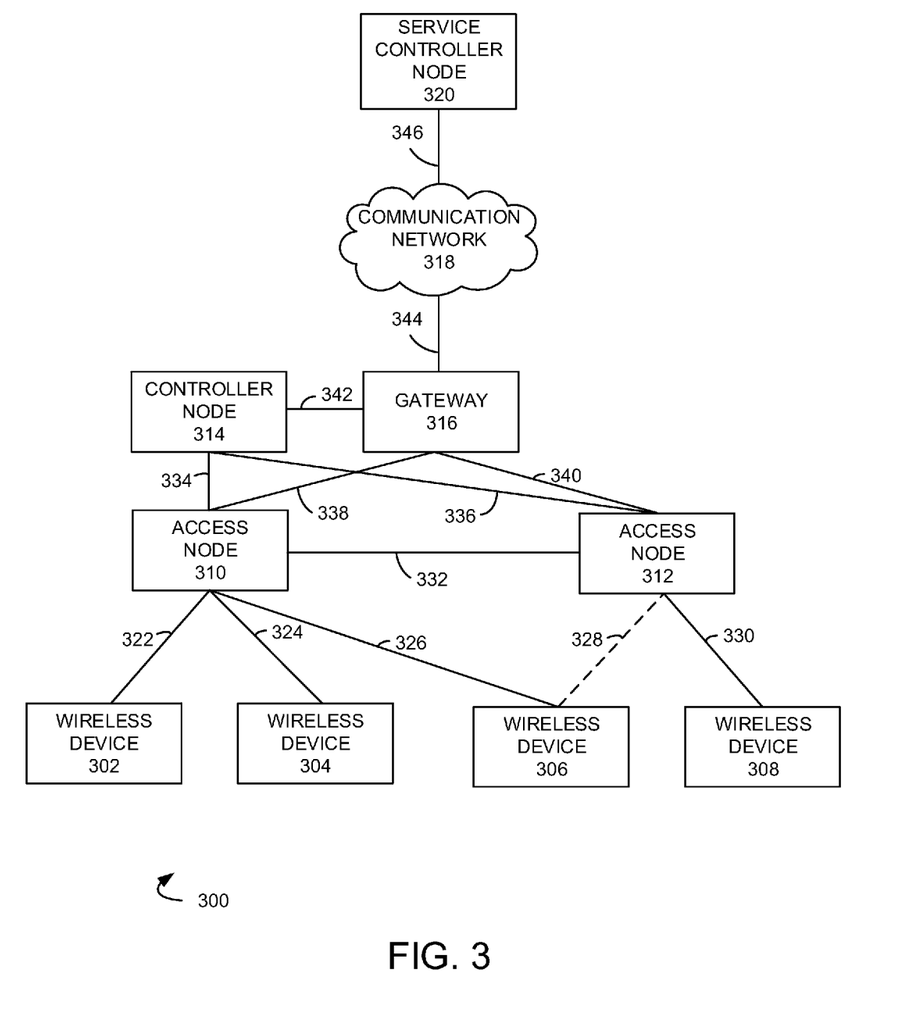
FIG. 3 illustrates another communication system to allocate a frequency band in a wireless communication network.

FIG. 3 illustrates another exemplary communication system 300 for allocating a frequency band in a wireless communication network. Communication system 300 can comprise wireless devices 302, 304, 306, 308, access nodes 310, 312, controller node 314, gateway 316, communication network 318, and service controller node 320. Other network elements may be present in the communication system 300 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 310, 312 and communication network 318, which are omitted for clarity, including additional processing nodes, routers, gateways, and physical and/or wireless data links for carrying data among the various network elements.

Wireless devices 302, 304, 306, 308 can be any device configured to communicate over communication system 300 using a wireless interface. For example, wireless devices 302, 304, 306, 308 can include a remote terminal unit, a cell phone, a smart phone, a computing platform such as a laptop, palmtop, or a tablet, a personal digital assistant, or an internet access device, and combinations thereof. It is noted that while four wireless devices are illustrated in FIG. 3 as being in communication with access nodes 310, 312, respectively, any number of wireless devices can be implemented according to various exemplary embodiments disclosed herein.

The wireless interface of wireless devices 302, 304, 306, 308 can include one or more transceivers for transmitting and receiving data over communication system 300. Each transceiver can be associated with the same or different frequency bands, the same or different radio access technologies, the same or different network providers, and/or the same or different services. For example, wireless devices 302, 304, 306, 308 can include a transceiver associated with at least one wireless cellular protocol service and/or other types of wireless communication services such as a multimedia broadcast multicast service (MBMS). In addition, wireless devices 302, 304, 306, 308 can further include a transceiver that is associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), MBMS, etc.

Wireless device 302 can be in communication with access node 310 through communication link 322. Wireless device 304 can be in communication with access node 310 through communication link 324. Wireless device 306 can be in communication with access node 310 through communication link 326. Wireless device 308 can be in communication with access node 312 through communication link 330. Links 322, 324, 326, 330 can use various communication media, such as air, space, metal, optical fiber, or some other signal propagation path—including combinations thereof. Communication links 322, 324, 326, 330 may comprise many different signals sharing the same link. Communication links 322, 324, 326, 330 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 302 and access node 310 could share the same representative wireless link, but be transferred over different communication sessions, frequencies, timeslots, packets, ports, sockets, logical transport links, or in different directions— including combinations thereof.

Wireless devices 302, 304, 306, 308 can transmit and/or receive information over system 300 using various communication services. These services can include various unicast and/or broadcast services or applications such as voice, data and/or MBMS. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 310, 312 can be any network node configured to provide communication between wireless devices 302, 304, 306, 308 and communication network 318. For example, access nodes 310, 312 can be selected from a base transceiver station, a radio base station, an eNodeB device, or an enhanced eNodeB device, or the like. It is noted that while two access nodes 310, 312 are illustrated in FIG. 3, any number of access nodes can be implemented within system 300.

Access nodes 310, 312 can comprise a processor and associated circuitry to execute or direct the execution of computer-readable instructions to obtain information. Access node 310, 312 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 310, 312 can receive instructions and other input at a user interface.

Controller node 314 can be any network node configured to communicate control information over system 300. Controller node 314 can be a standalone computing device, computing system, or network component, and can be accessible, for example, by a wired or wireless connection, or through an indirect connection such as through a computer network or communication network. For example, controller node 314 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 314 is not limited to any specific technology architecture, such as Long Term Evolution (LTE) and can be used with any network architecture and/or protocol.

Controller node 314 can comprise a processor and associated circuitry to execute or direct the execution of computer-readable instructions to obtain information. Controller node 314 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Control node 314 can receive instructions and other input at a user interface.

Gateway 316 can be any network node configured to interface with other network devices using various protocols. Gateway 316 can communicate user data over system 300. Gateway 316 can be a standalone computing device, computing system, or network component, and can be accessible, for example, by a wired or wireless connection, or through an indirect connection such as through a computer network or communication network. For example, gateway 316 can include a serving gateway (SGW) and/or a public data network gateway (PGW), etc. One of ordinary skill in the art would recognize that gateway 316 is not limited to any specific technology architecture, such as Long Term Evolution (LTE) and can be used with any network architecture and/or protocol.

Gateway 316 can comprise a processor and associated circuitry to execute or direct the execution of computer-readable instructions to obtain information. Gateway 316 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 316 can receive instructions and other input at a user interface.

Service controller node 320 can be any network node configured to communicate service information and/or service control information over system 300. Service controller node 320 can be a standalone computing device, computing system, or network component, and can be accessible, for example, by a wired or wireless connection, or through an indirect connection such as through a computer network or communication network. For example, service controller node 320 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that service controller node 320 is not limited to any specific technology architecture, such as Long Term Evolution (LTE) and can be used with any network architecture and/or protocol.

Service controller node 320 can comprise a processor and associated circuitry to execute or direct the execution of computer-readable instructions to obtain information. Service controller node 320 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Service controller node 320 can receive instructions and other input at a user interface.

Access node 310 can be in communication with access node 312 through communication link 332. Access node 310 can be in communication with controller node 314 through communication link 334. Access node 312 can be in communication with controller node 314 through communication link 336. Access node 310 can be in communication with gateway 316 through communication link 338. Access node 312 can be in communication with gateway 316 through communication link 340. Controller node 314 can be in communication with gateway 316 through communication link 342. Gateway 316 can be in communication with communication network 318 through communication link 344. Service controller node 320 can be in communication with communication network 318 through communication link 346. Communication links 332, 334, 336, 338, 340, 342, 344, 346 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 332, 334, 336, 338, 340, 342, 344, 346 can be a direct link or might include various equipment, intermediate components, systems, and networks.

Communication network 318 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 318 can be capable of carrying data, for example, to support voice, push-to-talk, broadcast video, and data communications by a wireless device such as wireless devices 302, 304, 306, 308. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 318 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 318 can also comprise additional base stations, controller nodes, telephony switches, internet routers, network gateways, computer systems, communication links, or some other type of communication equipment, and combinations thereof.

A network operator can be a communication provider that provides access to a network where data streams are transmitted between a wireless device and an access node over a unicast communication session. A broadcast service provider can be a communication provider that provides a broadcast data stream from an access node to a plurality of wireless devices over a broadcast communication session. A network operator and/or a broadcast service provider can own and/or operate the nodes within the network. A primary network operator and/or a broadcast service provider can enter into relationships with other network operators and/or broadcast service providers to share resources such as frequency bands, network environments, etc. For example, multiple network providers may operate in a multi-operator core network environment, and can enter into agreements to share frequency bands or other network resources. Sharing or roaming agreements may be limited in scope, and network providers can share resources of the network while not sharing other resources of the network. For example, one network provider and/or broadcast service provider can share one frequency band with a second network provider and/or broadcast service provider while not sharing resources of another frequency band.

In operation, a first access node such as access node 310 can be configured to transmit a first service data stream and a second service data stream different from the first data stream over a first frequency band. A second access node such as access node 312 can be configured to transmit the first data stream and a third service data stream over a second frequency band where the third service data stream can be associated with the same service provider as the second service data stream. In addition, the first frequency band and the second frequency band can be associated with the same frequency or a different frequency. For example, the first service data stream can be a broadcast service such as MBMS and the second service and/or third service data stream can be a unicast service such as voice, data, email, etc.

When access node 310 transmits the first service data stream and the second service data stream over the first frequency band, the access node 310 can also transmit a first system information message to indicate to a wireless device, such as wireless devices 302, 304, 306, the availability of the first service and the second service over the first frequency band. Wireless devices 302, 304, 306 can use the first system information message to determine whether to initiate communication with access node 310. The first system information message can include a first service identifier associated with the first service and a second service identifier associated with the second service. The first system information message can be a SIB-1 message.

When access node 312 transmits the first service data stream and the third service data stream over the second frequency band, the access node 312 can also transmit a second system information message to indicate to a wireless device, such as wireless device 308, the availability of the first service and the third service over the second frequency band. Wireless device 308 can use the second system information message to determine whether to initiate communication with access node 312. The second system information message can include a third service identifier associated with the first service and a fourth service identifier associated with the second or third service. The second system information message can be a SIB-1 message.

Service controller node 320 can determine to discontinue transmitting the second service over the first frequency band associated with the first access node. In addition, service controller node 320 can also determine to discontinue transmitting the first service over the second frequency band associated with the second access node. For example, service controller node 320 can determine to transmit only one service over each frequency band. This determination can be based on a predetermined time period, a service operator and/or a broadcast provider determination, and/or network conditions.

After determining to discontinue transmitting the second service over the first frequency band and to discontinue transmitting the first service over the second frequency band, the service controller node 320 can instruct access nodes 310, 312 to modify their service information message. For example, service controller node 320 can instruct access node 310 to transmit a third system information message comprising only the first service identifier to indicate to a wireless device the availability of only the first service over the first frequency band. Service controller node 320 can further instruct access node 312 to transmit a third system information message comprising only the second service identifier to indicate to a wireless device the availability of only the second service over the second frequency band.

When a wireless device such as wireless device 306 has already established communication with access node 310 using the second service over the first frequency band and access node 310 transmits the third system information message, a handover process can be initiated. For example, wireless device 306 or access node 310 can initiate handing over wireless device 306 to access node 312 after access node 312 transmits the fourth system information message advertising the availability of the second service over the second frequency band. Wireless device 306 can then initiate communication with access node 312 over communication link 328 and discontinue communication with access node 310 over communication link 326.

After the period for transmitting only one service in each frequency band is elapsed (e.g., either based on a predetermined time period or an indication from the service provider and/or the broadcast provider) and/or network conditions no longer meet a threshold, service controller 320 can instruct access node 310 to re-transmit the first system information message and access node 312 to re-transmit the second system information message. After the access nodes 310, 312 resume transmitting the respective services over the first and second frequency band, a wireless device can initiate communication with the access nodes when an application running on the wireless device uses the respective services.

Figure 4:
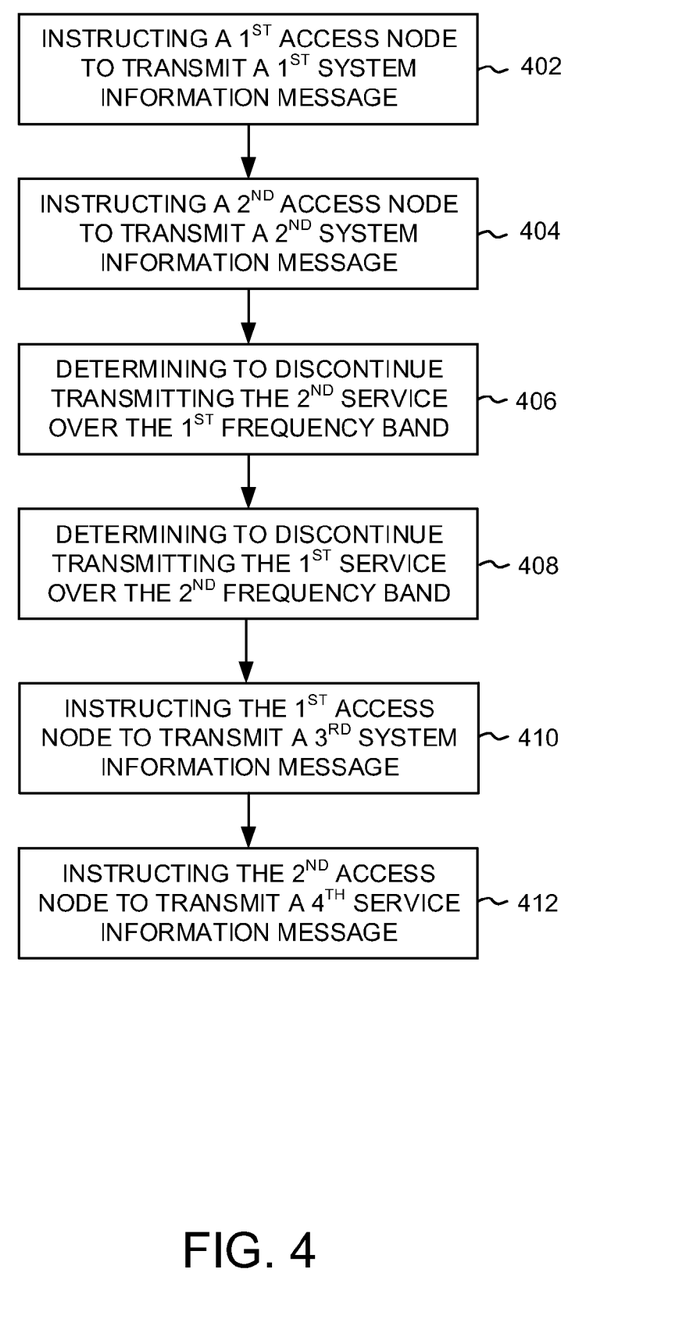
FIG. 4 illustrates another exemplary method of allocating a frequency band in a wireless communication network.

FIG. 4 illustrates a flow chart of an exemplary method of frequency band allocation in a wireless communication network. The method will be discussed with reference to the exemplary communication system 300 illustrated in FIG. 3. However, the method can be implemented with any suitable communication system. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 402, a network node can instruct a first access node to transmit a first system information message and at 404 the network node can instruct a second access node to transmit a second information message. For example, access node 310 can transmit a first system information message comprising a first service identifier associated with a first service and a second service identifier associated with a second service. The first system information message can indicate to a wireless device the availability of the first service and the second service over the first frequency band. Access node 312 can transmit a second system information message comprising a third service identifier associated with the first service and a fourth service identifier associated with the second service. The third service identifier and the fourth service identifier can the same or different from the first and/or second service identifier where the first, second, third, and/or fourth service identifier can be a PLMN identifier or any other identifier used to indicate the type of service, application, and/or data associated with a service provider. The second system information message can indicate to a wireless device the availability of the first service and the second service over the second frequency band. The first and second system information messages can be SIB-1 messages. Any wireless device, such as wireless devices 302, 304, 306, 308 can determine whether to initiate communication with access node 310 or access node 312 based on an application running on the wireless device and the services available within the first and/or second frequency band.

The network node can determine to discontinue transmitting the second service over the first frequency band at 406 and to discontinue transmitting the first service over the second frequency band at 408. For example, service controller node 320 can be determined based on various factors. For example, the time of day, network conditions associated with access nodes 310 and/or 312, and/or network conditions associated with a plurality of access nodes of the network such as a service area or a market area.

After determining to discontinue transmitting the second service over the first frequency band and first service over the second frequency band, the network node can instruct the first access node to transmit a third system information message at 410 and the second access node to transmit a fourth service information message at 412. For example, access node 310 can be instructed to transmit the third system information message where the third system information message includes only the first service identifier to indicate to a wireless device that only the first service is available over the first frequency band. Access node 312 can be instructed to transmit the fourth information message where the fourth system information message includes only the second service identifier to indicate to a wireless device that only the second service is available over the second frequency band.

In an exemplary embodiment, a network node could determine to modify only one frequency band rather than both the first frequency band and the second frequency band as previously described. For example, service controller node 320 could determine to only discontinue transmitting the second service over the first frequency band and thus only instruct access node 310 to transmit the third system information message. Access node 312 could continue to transmit the second system information message rather than being instructed to transmit the fourth system information message.

Figure 5:
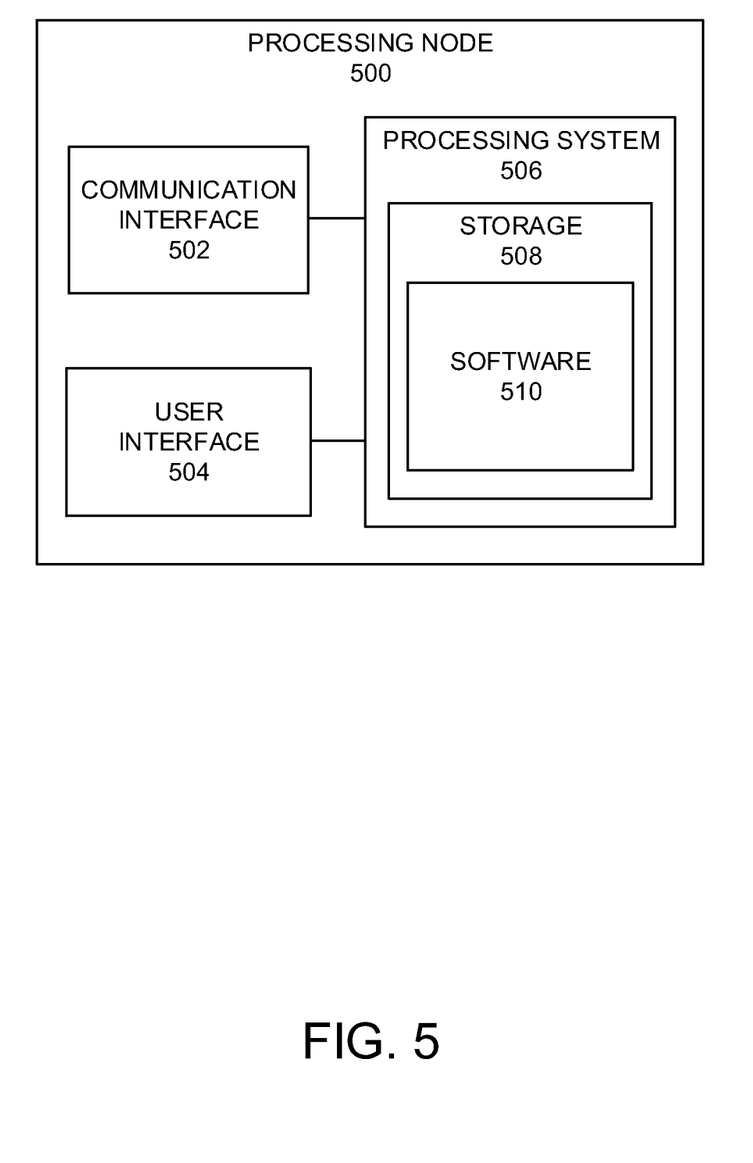
FIG. 5 illustrates an exemplary processing node according to an exemplary embodiment of the present disclosure.

FIG. 5 illustrates an exemplary processing node 500 in a communication system. Processing node 500 comprises communication interface 502, user interface 504, and processing system 506 in communication with communication interface 502 and user interface 504. Processing node 500 is capable of monitoring communications in a communication network. Processing system 506 includes storage 508, which can comprise a disk drive, flash drive, memory circuitry, or other memory device. Storage 508 can store software 510 which is used in the operation of the processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 can permit processing node 500 to communicate with other network elements. User interface 504 can permit the configuration and control of the operation of processing node 500.

Examples of processing node 500 include access nodes 104, 310, 312, service controller nodes 108, 320, controller node 314, and gateway 316. Processing node 500 can also be an adjunct or component of a network element, such as an element of access nodes 104, 310, 312, service controller nodes 108, 320, controller node 314, and gateway 316. Processing node 500 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of frequency band allocation in a wireless communication network, comprising:
instructing a first access node to transmit a first system information message, the first system information message comprising a first service identifier associated with a first service and a second service identifier associated with a second service to indicate availability of the first service and the second service over a first frequency band;
instructing a second access node to transmit a second system information message, the second system information message comprising a third service identifier associated with the first service and a fourth service identifier associated with the second service to indicate availability of the first service and the second service over a second frequency band;
determining at the network node to discontinue transmitting the second service over the first frequency band associated with the first access node and to discontinue transmitting the first service over the second frequency band associated with the second access node;
instructing the first access node to transmit a third system information message after the network node determines to discontinue transmitting the second service over the first frequency band, the third system information message comprising only the first service identifier to indicate availability of only the first service over the first frequency band; and
instructing the second access node to transmit a fourth system information message after the network node determines to discontinue transmitting the first service over the second frequency band, the fourth system information message comprising only the second service identifier to indicate availability of only the second service over the second frequency band.

2. The method of claim 1, further comprising:
instructing the first access node to re-transmit the first system information message to indicate the availability of the first service and the second service over the first frequency band after transmitting the third system information message; and
instructing the second access node to re-transmit the second system information message to indicate the availability of the first service and the second service over the second frequency band after transmitting the fourth system information message.

3. The method of claim 1, further comprising:
receiving a request from a wireless device to initiate communication with the first access node or the second access node based on an application running on the wireless device and at least one of the first system information message, the second system information message, the third system information message, and the fourth system information message.

4. The method of claim 1, further comprising:
granting a request at the network node from a first wireless device to initiate communication with the first access node, wherein the request from the first wireless device comprises a request to establish communication using the second service over the first frequency band after the first system information message is transmitted; and
instructing the first access node to initiate handing over the first wireless device to the second access node after the first access node transmits the third system information message and the second access node transmits the fourth system information message.

5. The method of claim 1, wherein the first service is multimedia broadcast multicast service (MBMS) and the second service is a unicast service.

6. The method of claim 1, wherein the first system information message, the second system information message, the third system information message, and the fourth system information message are system information block one (SIB-1) messages.

7. The method of claim 1, wherein the first service identifier and the third service identifier are a public land mobile network (PLMN) identifier of a multimedia broadcast multicast service (MBMS) provider and the second service identifier and the fourth service identifier are a PLMN identifier of a network operator.

8. A system for frequency band allocation in a wireless communication network, comprising:
  a processing node comprising a processor and a memory, the processing node being configured to:
    instruct a first access node to transmit a first system information message, the first system information message comprising a first service identifier associated with a first service and a second service identifier associated with a second service to indicate availability of the first service and the second service over a first frequency band;
    instruct a second access node to transmit a second system information message, the second system information message comprising a third service identifier associated with the first service and a fourth service identifier associated with the second service to indicate availability of the first service and the second service over a second frequency band;
    determine at the network node to discontinue transmitting the second service over the first frequency band associated with the first access node and to discontinue transmitting the first service over the second frequency band associated with the second access node;
    instruct the first access node to transmit a third system information message after the network node determines to discontinue transmitting the second service over the first frequency band, the third system information message comprising only the first service identifier to indicate availability of only the first service over the first frequency band; and
    instruct the second access node to transmit a fourth system information message after the network node determines to discontinue transmitting the first service over the second frequency band, the fourth system information message comprising only the second service identifier to indicate availability of only the second service over the second frequency band.

9. The system of claim 8, wherein the processing node is further configured to:
  receive a request from a wireless device to initiate communication with the access node based on an application running on the wireless device and the first system information message or the second system information message; and
  instruct the access node to initiate a handover of the wireless device from the frequency band after transmitting the second system information message when the wireless device initiated a communication session using the second service.

10. The system of claim 8, wherein the first service is a multimedia broadcast multicast service (MBMS) and the second service is a unicast service.

11. The system of claim 8, wherein the first system information message and the second system information message are system information block one (SIB-1) messages.

12. The system of claim 8, wherein the first service identifier is a public land mobile network (PLMN) identifier of a multimedia broadcast multicast service (MBMS) provider and the second service identifier is a PLMN identifier of a network operator.

* * * * *